US012700430B2

(12) United States Patent
Kim et al.

(10) Patent No.: US 12,700,430 B2
(45) Date of Patent: Aug. 4, 2026

(54) ELECTRONIC DEVICE, METHOD, AND COMPUTER READABLE STORAGE MEDIUM FOR EDITING VIDEO

(71) Applicant: THINKWARE CORPORATION, Seongnam-si (KR)

(72) Inventors: Yubeen Kim, Seongnam-si (KR);
Taekyun Kim, Seongnam-si (KR);
Hangeul Lee, Seongnam-si (KR);
Minsuk Kang, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 18/904,361

(22) Filed: Oct. 2, 2024

(65) Prior Publication Data

US 2025/0118339 A1       Apr. 10, 2025

(30) Foreign Application Priority Data

Oct. 6, 2023    (KR) ........................ 10-2023-0133801

(51) Int. Cl.
| | |
|---|---|
| *G06V 20/58* | (2022.01) |
| *G06F 3/04845* | (2022.01) |
| *G06V 10/82* | (2022.01) |
| *G06V 20/40* | (2022.01) |
| *G06V 20/62* | (2022.01) |
| *G11B 27/036* | (2006.01) |

(52) U.S. Cl.
CPC ........ *G11B 27/036* (2013.01); *G06F 3/04845* (2013.01); *G06V 10/82* (2022.01); *G06V 20/41* (2022.01); *G06V 20/58* (2022.01); *G06V 20/625* (2022.01)

(58) Field of Classification Search
CPC ......... G06V 20/58; G06V 10/82; G06V 20/41
USPC ........................ 386/278, 280, 282, 239, 248
See application file for complete search history.

(56) References Cited

U.S. PATENT DOCUMENTS

| | | | | |
|---|---|---|---|---|
| 8,731,373 B2 * | 5/2014 | Gerbasi, III | ....... | H04N 21/4334 |
| | | | | 386/278 |
| 10,733,471 B1 * | 8/2020 | Wilbert | ................... | G06T 11/60 |
| 2013/0287370 A1 * | 10/2013 | Groszko | ................ | H04N 5/765 |
| | | | | 725/38 |

(Continued)

FOREIGN PATENT DOCUMENTS

| | | |
|---|---|---|
| KR | 10-2016-0146343 A | 12/2016 |
| KR | 10-2017-0000091 A | 1/2017 |

*Primary Examiner* — Daquan Zhao
(74) *Attorney, Agent, or Firm* — WHDA, LLP

(57) ABSTRACT

At least one processor of an electronic device is configured to obtain a video including a vehicle. The processor is configured to display, using a first platform for sharing the video, a first visual object indicating the first platform, and a second visual object corresponding to a second platform distinct from the first platform. The processor is configured to display, based on a first input with respect to the first visual object among the first visual object and the second visual object, a first screen providing a first editing function, on a display. The processor is configured to display, based on a second input with respect to the second visual object among the first visual object and the second visual object, a second screen providing a second editing function for changing at least one of a size or a length of the video, on the display.

20 Claims, 7 Drawing Sheets

(56) References Cited

U.S. PATENT DOCUMENTS

| 2022/0335728 | A1* | 10/2022 | Kim | .................. | G06V 10/7747 |
| 2023/0132646 | A1* | 5/2023 | Ratti | .................... | H04N 7/181 |
| | | | | | 348/159 |

* cited by examiner

ELECTRONIC DEVICE, METHOD, AND COMPUTER READABLE STORAGE MEDIUM FOR EDITING VIDEO

CROSS-REFERENCE TO RELATED APPLICATION(S)

This application is based on and claims priority under 35 U.S.C. § 119 to Korean Patent Application No. 10-2023-0133801, filed on Oct. 6, 2023, in the Korean Intellectual Property Office, the disclosure of which is incorporated by reference herein in its entirety.

BACKGROUND

Technical Field

The present disclosure relates to an electronic device, a method, and a computer-readable storage medium for editing a video.

Description of Related Art

An electronic device may provide, by using a sharing platform for sharing a video, an event identified through a video to users using the sharing platform. The event may indicate accident information related to a vehicle. The electronic device may share the accident information with the users using the sharing platform. The above-described information may be provided as a related art for the purpose of helping to understand the present disclosure. No claim or determination is raised as to whether any of the above-described information may be applied as a prior art related to the present disclosure.

SUMMARY

An electronic device according to an embodiment may use a software application for sharing a video. The electronic device may edit the video before sharing the video using the software application. The electronic device may provide an editing function corresponding to an external electronic device to which a video will be shared, by using the software application.

The electronic device may provide an editing function corresponding to an external electronic device with which a video will be shared, by using the software application. those having ordinary knowledge in the art to which the present disclosure belongs, from the following description.

According to an embodiment, an electronic device may comprise communication circuitry, a memory, a display, and at least one processor. The at least one processor may be configured to obtain a video including a vehicle. The at least one processor may be configured to display, using a first platform for sharing the video, a first visual object indicating the first platform, and a second visual object corresponding to a second platform distinct from the first platform. The at least one processor may be configured to display, based on a first input with respect to the first visual object among the first visual object and the second visual object, a first screen providing a first editing function, on the display. The at least one processor may be configured to display, based on a second input with respect to the second visual object among the first visual object and the second visual object, a second screen providing a second editing function for changing at least one of a size or a length of the video, on the display.

According to an embodiment, a method of an electronic device with communication circuitry, a memory, a display, and at least one processor may comprise obtaining a video including a vehicle. The method may comprise displaying, using a first platform for sharing the video, a first visual object indicating the first platform, and a second visual object corresponding to a second platform distinct from the first platform. The method may comprise displaying, based on a first input with respect to the first visual object among the first visual object and the second visual object, a first screen providing a first editing function, on the display. The method may comprise displaying, based on a second input with respect to the second visual object among the first visual object and the second visual object, a second screen providing a second editing function for changing at least one of a size or a length of the video, on the display.

According to an embodiment, a non-transitory computer readable storage medium storing one or more programs, the one or more programs may comprise instructions, when executed by an electronic device, cause the electronic device to obtain a video including a vehicle. The one or more programs may comprise instructions, when executed by the electronic device, cause the electronic device to display, using a first platform for sharing the video, a first visual object indicating the first platform, and a second visual object corresponding to a second platform distinct from the first platform. The one or more programs may comprise instructions, when executed by the electronic device, cause the electronic device to display, based on a first input with respect to the first visual object among the first visual object and the second visual object, a first screen providing a first editing function, on a display. The one or more programs may comprise instructions, when executed by the electronic device, cause the electronic device to display, based on a second input with respect to the second visual object among the first visual object and the second visual object, a second screen providing a second editing function for changing at least one of a size or a length of the video, on the display.

An electronic device according to an embodiment can use a software application for sharing a video. The electronic device can edit a video before sharing the video using the software application. The electronic device can require a method for providing an editing function corresponding to an external electronic device to which a video will be shared, by using the software application.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

Figure 1:
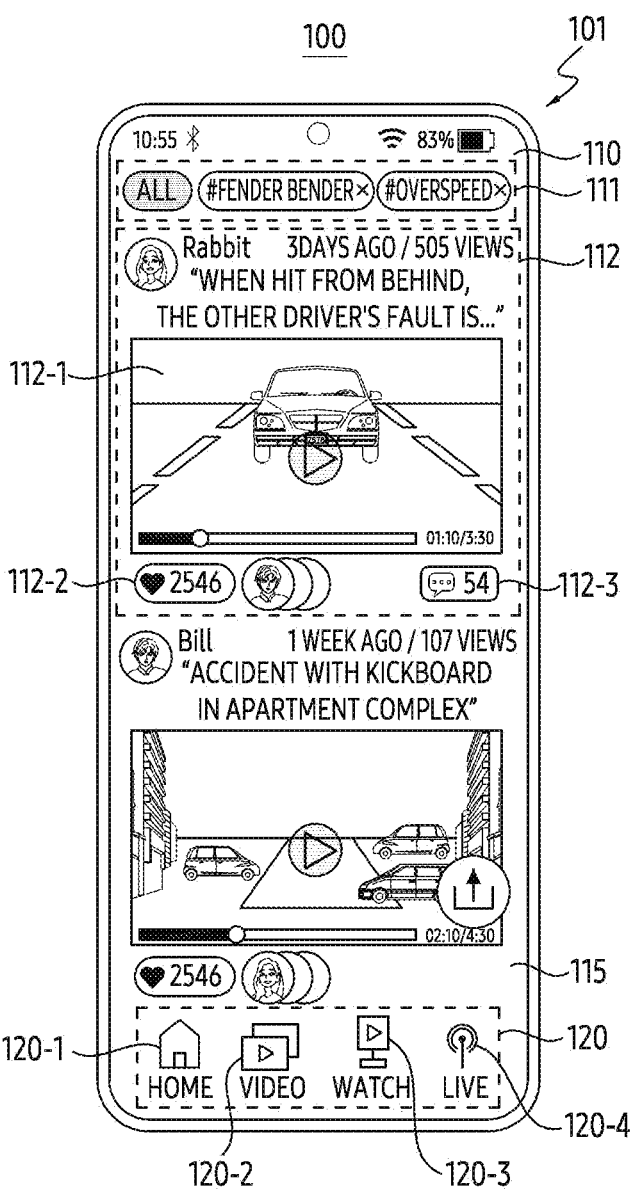
FIG. 1 illustrates an example of a screen of a software application for sharing a video, according to an embodiment.

The electronic device according to various embodiments disclosed in the present document may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine (e.g., the electronic device 101). For example, a processor of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. Hereinafter, embodiments of the present disclosure will be described in detail with reference to drawings so that those having ordinary knowledge in the art to which the present disclosure belongs may easily implement it. However, the present disclosure may be implemented in various different forms and is not limited to the embodiments described herein. In relation to the description of the drawings, identical or similar reference numerals may be used for identical or similar components. In addition, in the drawings and related descriptions, descriptions of well-known features and configurations may be omitted for clarity and brevity.

FIG. 1 illustrates an example of a screen of a software application for sharing a video, according to an embodiment. Referring to FIG. 1, in an embodiment, an electronic device 101 may be referred to as a terminal (or user terminal) in terms of being owned by a user. The terminal may include, for example, a personal computer (PC) such as a laptop and a desktop. The terminal may include, for example, a smartphone, a smart pad, and/or a tablet PC. The terminal may include a smart accessory such as a smartwatch and/or a head-mounted device (HMD).

Figure 2:
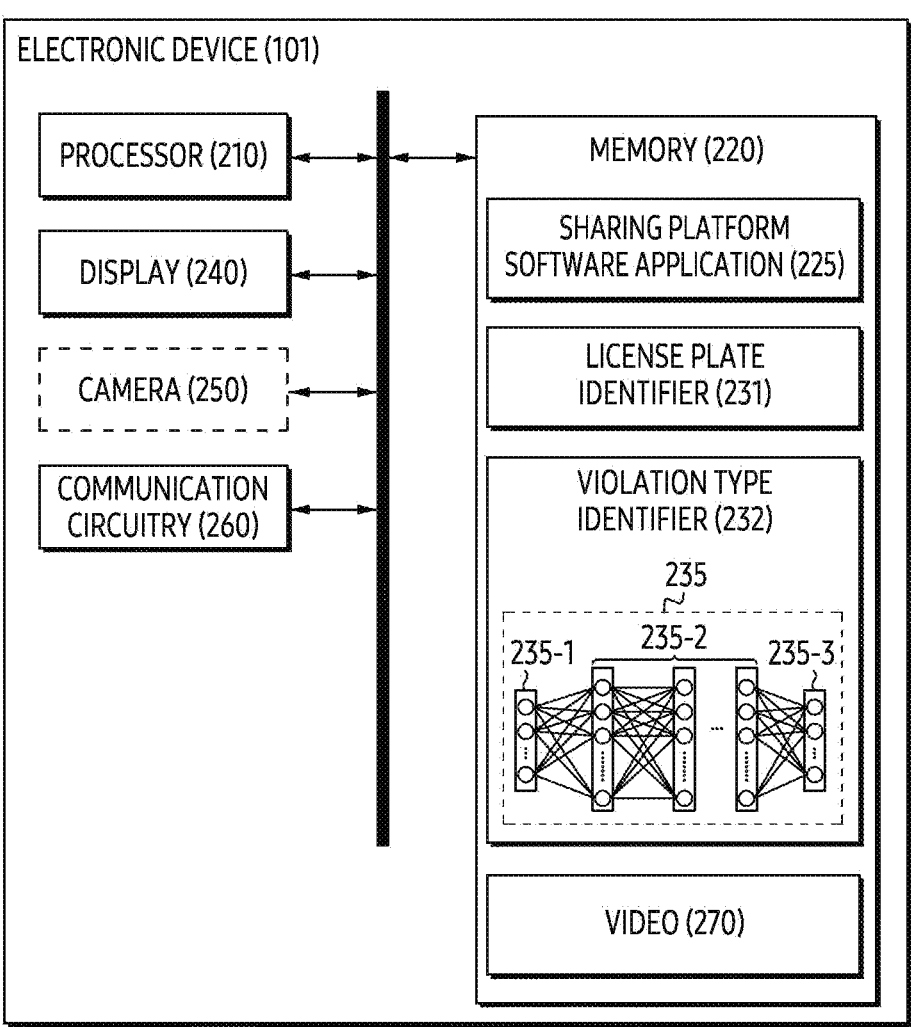
FIG. 2 illustrates an example of a block diagram of an electronic device according to an embodiment.
Figure 2:
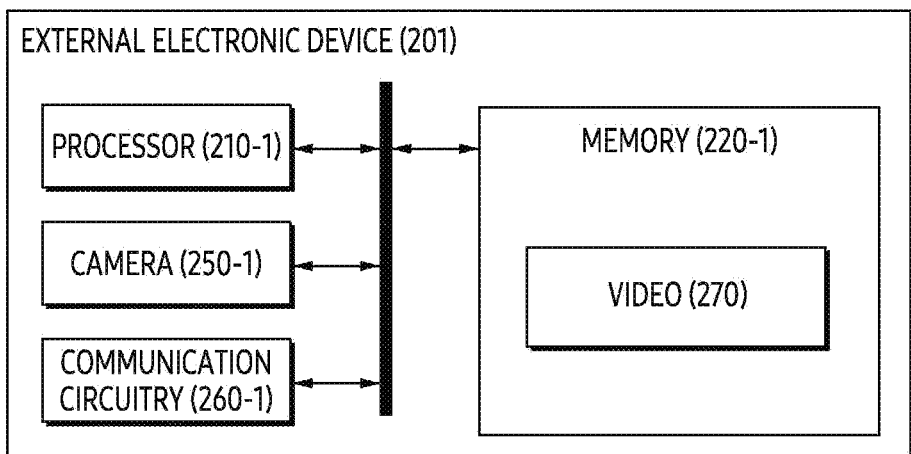

Referring to FIG. 1, according to an embodiment, in a state 100, the electronic device 101 may display a screen 110, based on execution of at least one software application (e.g., a sharing platform software application 225 of FIG. 2). The at least one software application may include an application that provides a social network service (SNS) for sharing a video. The at least one software application may include a software application for providing a platform for sharing a video. The video may include at least one vehicle. The video may be obtained by an external electronic device mountable to another vehicle based on a direction toward the at least one vehicle. The video may be referred to as a black box image in terms of being obtained by the external electronic device mounted on the other vehicle.

For example, the screen 110 may include one or more videos provided from other external electronic devices distinct from the electronic device 101. The screen 110 may include a visual object 111 to distinguish types of videos stored within a platform (or an external electronic device providing at least one software application). The visual object may mean an object that is deployable within a screen for transmission of information and/or interaction, such as text, an image, an icon, a video, a button, a check box, a radio button, a text box, a slider and/or a table. The visual object may be referred to as a visual guide, a virtual object, a visual element, a UI element, a view object, and/or a view element. The type of videos may include a violation type of vehicles corresponding to each of the videos. The violation type of vehicles may include an event corresponding to each of the vehicles. The event may be identified based on a fender bender (or any kinds of traffic accident), a traffic signal violation, and/or a vehicle having a speed greater than or equal to a designated threshold speed, or a combination thereof, which correspond to each of the videos. The event may be identified based on a neural network trained based on training data indicating road traffic. The electronic device 101 may identify the violation type of vehicles included in each of the videos, based on the neural network (e.g., a violation type identifier 232 of FIG. 2). However, it is not limited thereto. As an example, the type of videos uploaded to a sharing platform may be set by a user input. The electronic device 101 may display, on a display, a screen including videos related to the type, in response to an input for a visual element corresponding to the type included in the visual object 111. The visual object 111 may be referred to as a hash tag (or a metadata tag) in terms of being used to distinguish videos related to the type.

For example, the electronic device 101 may display the screen 110 including media content 112. The electronic device 101 may play (or stream) a video 112-1 displayed together with the screen 110. The electronic device 101 may play the video 112-1, based on the video 112-1 being displayed on the display for a designated time. In response to an input to the video 112-1, the electronic device 101 may display the video 112-1 on the entire display instead of displaying the screen 110. However, it is not limited thereto. The media content 112 may include the video 112-1 and metadata related to the video 112-1. Referring to FIG. 1, an embodiment in which the electronic device 101 displays information for explaining an account corresponding to a user who uploaded the video 112-1 (e.g., an icon assigned to the account and/or a nickname such as "Rabbit") together with the video 112-1 on the screen 110 is illustrated, but the embodiment is not limited thereto. The electronic device 101 may display, together with the video 112-1, a view count of the video 112-1 (e.g., "505 views"), a time when the video 112-1 was uploaded (e.g., "3 days ago"), and/or a name (or title) assigned to the video 112-1 (e.g., "When hit from behind, the other driver's fault is . . . ").

In an embodiment, the electronic device 101 may display, together with the video 112-1, comments corresponding to the video 112-1 and/or the number of comments (e.g., "54"), and/or the number of users reacting to the video 112-1 (e.g., the number of users pressing the like button, such as "2546"). For example, the electronic device 101 may display, adjacent to the video 112-1, a visual object 112-2 that indicates interest (or preference) of users using a sharing platform. The electronic device 101 may display, adjacent to the video 112-1, a visual object 112-3 for checking comments related to the video 112-1.

The electronic device 101 according to an embodiment may display a visual object 115 for uploading a video to a sharing platform or transmitting the video to another platform distinct from the sharing platform, by at least partially overlapping the screen 110. In response to an input to the visual object 115, the electronic device 101 may display, on the display, another visual object for selecting the upload to the sharing platform or the transmission to the other platform. An operation in which the electronic device 101 displays the other visual object on the display will be described later with reference to FIG. 3.

The screen 110 according to an embodiment may include a navigation area 120. The navigation area 120 may include a visual object 120-1 indicating a home screen of at least one software application providing the screen 110, a visual object 120-2 for checking videos stored in the electronic device 101, a visual object 120-3 for checking videos uploaded to a sharing platform, and/or a visual object 120-4 for checking videos provided from other electronic devices in real time. As an example, the screen 110 may mean a screen displayed on the display in response to an input to the visual object 120-3 after the electronic device 101 executes at least one software application.

As described above, according to an embodiment, the electronic device 101 may display the screen 110 on the display, based on execution of at least one software application indicating a sharing platform for sharing videos. The electronic device 101 may provide videos uploaded by a plurality of users using the sharing platform, based on the execution of the at least one software application. The electronic device 101 may identify an interaction for each of videos generated between the plurality of users using the sharing platform. By identifying the interaction, the electronic device 101 may provide the user with feedback of the plurality of users (or experience of the plurality of users) on a violation type of a vehicle corresponding to each of the videos.

FIG. 2 illustrates an example of a block diagram of an electronic device according to an embodiment. An electronic device 101 of FIG. 2 may include the electronic device 101 of FIG. 1. Referring to FIG. 2, the electronic device 101 according to an embodiment may include at least one of a processor 210, a memory 220, a display 240, a camera 250, or communication circuitry 260. The processor 210, the memory 220, the display 240, the camera 250, and the communication circuitry 260 may be electronically and/or operably coupled with each other by an electronical component such as a communication bus. In an embodiment, hardware of the electronic device 101 being operably coupled may mean that a direct connection, or indirect connection between the hardware is established by wire or wirelessly so that second hardware among the hardware is controlled by first hardware. Although illustrated based on different blocks, the embodiment is not limited thereto, and a portion (e.g., at least a portion of the processor 210, the memory 220, and the communication circuitry 260) of the hardware of FIG. 2 may be included in a single integrated circuit such as a system on a chip (SoC). The type and/or number of hardware included in the electronic device 101 are not limited as illustrated in FIG. 2. For example, the electronic device 101 may include only a portion of the hardware components illustrated in FIG. 2.

According to an embodiment, the processor 210 of the electronic device 101 may include hardware for processing data based on one or more instructions. For example, hardware for processing data may include an arithmetic and logic unit (ALU), a floating point unit (FPU), a field programmable gate array (FPGA), a central processing unit (CPU), and/or an application processor (AP). The number of the processor 210 may be one or more. For example, the processor 210 may have a structure of a multi-core processor such as a dual core, a quad core, or a hexa core.

According to an embodiment, the memory 220 of the electronic device 101 may include a hardware component for storing data and/or an instruction inputted and/or outputted to the processor 210. For example, the memory 220 may include a volatile memory such as a random-access memory (RAM) and/or a non-volatile memory such as a read-only memory (ROM). For example, the volatile memory may include at least one of a dynamic RAM (DRAM), a static RAM (SRAM), a cache RAM, and pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disc, a solid state drive (SSD), and an embedded multimedia card (eMMC).

According to an embodiment, the display 240 of the electronic device 101 may output visualized information to a user. For example, the display 265 may be controlled by the processor 210 including a circuit such as a graphic processing unit (GPU), and output visualized information to the user. The display 240 may include a flat panel display (FPD) and/or electronic paper. The FPD may include a liquid crystal display (LCD), a plasma display panel (PDP), and/or one or more light emitting diodes (LEDs). The LED may include an organic LED (OLED).

According to an embodiment, the display 240 of the electronic device 101 may include a sensor (e.g., a touch sensor panel (TSP)) for detecting an external object (e.g., a user's finger) on the display 240. For example, the electronic device 101 may detect an external object contacting to the display 240 or floating on the display 240, based on the TSP. In response to detecting the external object, the electronic device 101 may execute a function related to a specific visual object corresponding to a location of the external object on the display 240 among visual objects displayed in the display 240.

According to an embodiment, the camera 250 of the electronic device 101 may include one or more optical sensors (e.g., a charged coupled device (CCD) sensor and a complementary metal oxide semiconductor (CMOS) sensor) that generate an electrical signal indicating a color and/or brightness of light. A plurality of optical sensors included in the camera 250 may be arranged in a form of a 2-dimensional array. The camera 250 may obtain an electrical signal of each of the plurality of optical sensors substantially simultaneously to generate images or frames that include a plurality of pixels, corresponding to light reaching the optical sensors of the 2-dimensional array and arranged in two dimensions. For example, photo data captured using the camera 250 may mean a plurality of images obtained from the camera 250. For example, a video captured using the camera 250 may mean a sequence of a plurality of images obtained from the camera 250 according to a designated frame rate. According to an embodiment, the electronic device 101 may further include a flash light, which is disposed in a direction in which the camera 250 receives light, to output light in the direction. For example, the electronic device 101 may obtain a video 270 including a vehicle through the camera 250. However, it is not limited thereto. The electronic device 101 may obtain a video 270 obtained by an external electronic device 201 through the communication circuitry 260.

In an embodiment, the communication circuitry 260 of the electronic device 101 may include a hardware component for supporting transmission and/or reception of an electrical signal between the electronic device 101 and an external electronic device. For example, the communication circuitry 260 may include at least one of a MODEM, an antenna, and an optic/electronic (O/E) converter. The communication circuitry 260 may support transmission and/or reception of an electrical signal, based on various types of protocols such as Ethernet, a local area network (LAN), a wide area network (WAN), a wireless fidelity (WiFi), Bluetooth, Bluetooth low energy (BLE), ZigBee, a long term evolution (LTE), 5G new radio (NR), and/or 6G. Referring to FIG. 2, one external electronic device 201 connected to the electronic device 101 is illustrated, but it is not limited thereto. The electronic device 101 may establish a communication link through the communication circuitry 260 with another external electronic device (e.g., a server providing a sharing platform application 225) distinct from the external electronic device 201.

According to an embodiment, one or more instructions (or commands) indicating a calculation and/or an operation to be performed by the processor 210 on data may be stored in the memory 220 of the electronic device 101. A set of one or more instructions may be referred to as a firmware, an operating system, a process, a routine, a sub-routine and/or an application. For example, when a set of instruction distributed in a form of an operating system, a firmware, a driver, and/or an application is executed, the electronic device 101 and/or the processor 210 may perform at least one of operations of FIG. 6. Hereinafter, an application (e.g., a software application) being installed in the electronic device 101 may mean that one or more instructions provided in the form of an application are stored in the memory 220 of the electronic device 101, and the one or more applications are stored in a format (e.g., a file having an extension specified by the operating system of the electronic device 101) executable by the processor 210 of the electronic device 101.

According to an embodiment, the electronic device 101 may display the screen 110 of FIG. 1 on the display 240, based on execution of the sharing platform application 225. The sharing platform application 225 may provide a social network service (SNS) for sharing a black box image. The sharing platform application 225 may provide videos (or media content) uploaded by a plurality of users in conjunction with an external server. The video 270 may be provided from the external electronic device 201 or may be obtained through the camera 250. The video 270 may include at least one vehicle and/or person (or animal).

According to an embodiment, the electronic device 101 may identify a license plate corresponding to a vehicle included in the video 270, based on execution of a license plate identifier 231. The electronic device 101 may identify an area corresponding to the license plate included in the video 270. The electronic device 101 may perform an operation for covering the license plate to protect the owner matched to the vehicle corresponding to the identified license plate. An operation of the electronic device 101 to cover the license plate will be described later with reference to FIG. 4B. As an example, the license plate identifier 231 may be a pre-trained neural network to identify a license plate in an image (or video), based on a single shot detector (SSD), and/or you only look once (YOLO). A neural network is a recognition model implemented with software or hardware that mimics computational power of a biological system using a large number of artificial neurons (or nodes). The neural network may perform a human cognitive function or a learning process through artificial neurons. For example, parameters related to the neural network may indicate a plurality of nodes included in the neural network and/or a weight assigned to a connection between the plurality of nodes. Referring to FIG. 2, a neural network 235 is illustrated to be included in the violation type identifier 232, but the embodiment is not limited thereto. For example, another neural network including different parameters from the neural network 235 included in the violation type identifier 232 may be included in the license plate identifier 231.

According to an embodiment, the electronic device 101 may analyze the video 270 based on the execution of the violation type identifier 232. The electronic device 101 may identify an event appearing from the video 270. Based on analyzing the video 270, the electronic device 101 may identify whether a vehicle included in the video 270 violates traffic rules. The violation type identifier 232 may be an example of a neural network trained to determine whether traffic rules has been violated. The electronic device 101 may obtain a violation type of a vehicle corresponding to the video 270 by inputting the video 270 to the violation type identifier 232. The violation type of the vehicle may vary according to traffic rules for each country.

According to an embodiment, the electronic device 101 may process a plurality of feature information, obtained from the video 270 based on the neural network 235 indicating the violation type identifier 232, and having different dimensions. The neural network 235 may have a structure based on fully connected layers. The neural network 235 may include an input layer 235-1, one or more hidden layers 235-2, and an output layer 235-3. The input layer 235-1 may receive a vector (e.g., a vector having elements corresponding to the number of nodes included in the input layer 235-1) indicating input data. Signals generated from each of the nodes in the input layer 235-1, which are generated by input data, may be transmitted from the input layer 235-1 to the hidden layers 235-2. The output layer 235-3 may generate output data of a second neural network based on one or more signals received from the hidden layers 235-2. For example, the output data may include a vector having elements corresponding to the number of nodes included in the output layer 235-3.

The one or more hidden layers 235-2 may be located between the input layer 235-1 and the output layer 235-3, and may convert input data transmitted through the input layer 235-1 into an easily predictable value. The input layer 235-1, the one or more hidden layers 235-2 and the output layer 235-3 may include a plurality of nodes. The one or more hidden layers 235-2 may be a convolution filter or a fully connected layer in a convolutional neural network (CNN), or various types of filters or layers bound based on special functions or features. According to an embodiment, the neural network may form a deep neural network by including numerous hidden layers 235-2. Training the deep neural network is called deep learning. Among nodes, a node included in the hidden layers 235-2 is referred to as a hidden node. Nodes included in the input layer 235-1 and the one or more hidden layers 235-2 may be connected to each other through a connection line having a connection weight, and nodes included in the hidden layer and the output layer may also be connected to each other through a connection line having a connection weight. At least one layer may skip a connection with the next layer. Accuracy may be increased by more deeply stacking the layers through skipping the layers. Tuning and/or learning a neural network may mean changing the connection weight between nodes included in each of layers (e.g., the input layer 235-1, the one or more hidden layers 235-2, and the output layer 235-3) included in the neural network. For example, tuning of the neural network may be performed based on supervised learning and/or unsupervised learning.

Referring to FIG. 2, in an embodiment, the external electronic device 201 may include at least one of a processor 210-1, a memory 220-1, a camera 250-1, or communication circuitry 260-1. In the external electronic device 201, the processor 210-1, the memory 220-1, the camera 250-1, and the communication circuitry 260-1 may be electronically and/or operably coupled with each other through a communication bus. The processor 210-1, the memory 220-1, the camera 250-1, and the communication circuitry 260-1 included in the external electronic device 201 may include a hardware component and/or a circuit that correspond to the processor 210, the memory 220, the camera 250, and the communication circuitry 260 of the electronic device 101. Hereinafter, in order to reduce repetition, descriptions of the processor 210-1, the memory 220-1, the camera 250-1, and the communication circuitry 250-1 included in the external electronic device 201 may be omitted within a range overlapping the processor 210, the memory 220, the camera 250, and the communication circuitry 260 in the electronic device 101.

According to an embodiment, the external electronic device 201 may be an electronic device (e.g., an image obtaining device for a vehicle) included in a vehicle. For example, the external electronic device 201 may be embedded in a vehicle before the vehicle is released. For example, the external electronic device 201 may be embedded inside and/or outside the vehicle, based on a separate process after the vehicle is released. For example, the external electronic device 201 may be mounted on the vehicle to be detachable after the vehicle is released. The external electronic device 201 may be referred to as a dashboard camera or a video recorder for a vehicle in terms of being embedded in the vehicle toward a specified direction (e.g., the vehicle's movement direction), but is not limited thereto. For example, the external electronic devices 201 may be one or more. Each of the one or more external electronic devices may have an independent direction and/or field-of-view (FOV). Each of the one or more external electronic devices may be disposed toward the front, left, right, and/or rear of the vehicle on which it is mounted. The one or more external electronic devices may obtain information on a surrounding environment of the vehicle, by being disposed toward the front, left, right, and/or rear of the vehicle based on four channels (or more than four channels) in terms of linking with each other. Videos (e.g., the video 270) obtained from each of the one or more external electronic devices may be transmitted to the electronic device 101 through communication circuitry. The videos may include information on the one or more external electronic devices respectively disposed toward designated directions.

Hereinafter, referring to FIG. 3, an example of an operation in which the electronic device 101 according to an embodiment shares the video 270 received from the external electronic device 201 to other users using the sharing platform application 225 will be described later.

Figure 3:
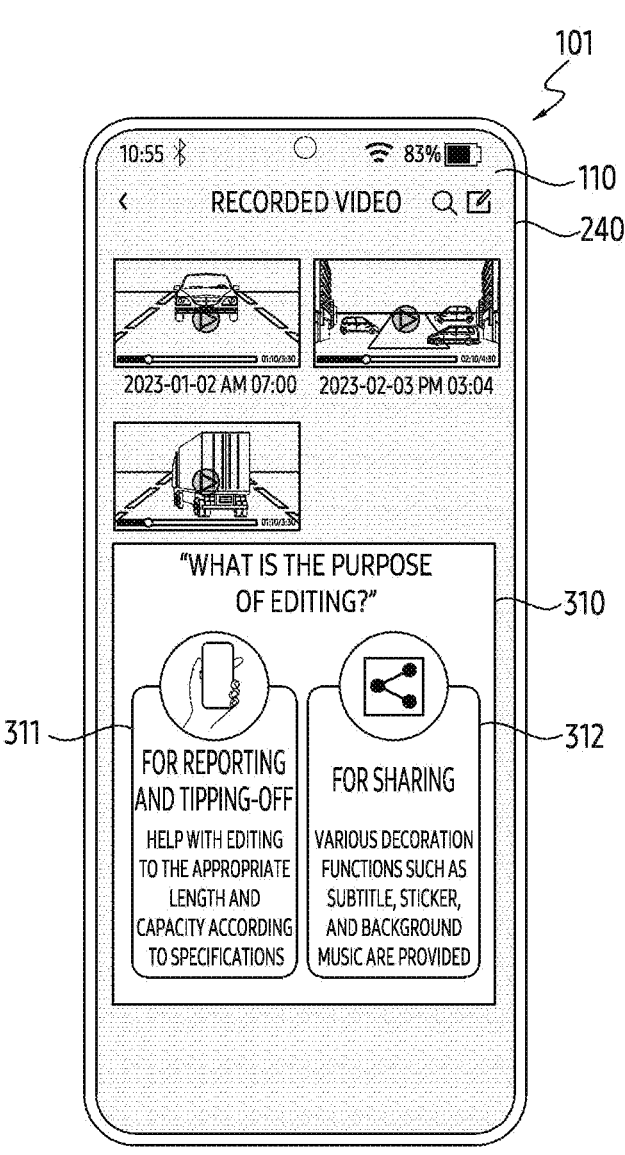
FIG. 3 illustrates an example of a visual object for selecting an external electronic device to which a video will be transmitted from an electronic device according to an embodiment.

FIG. 3 illustrates an example of a visual object for selecting an external electronic device to which a video will be transmitted from an electronic device according to an embodiment. An electronic device 101 of FIG. 3 may include the electronic device 101 of FIGS. 1 and 2.

Referring to FIG. 3, according to an embodiment, in order to transmit a video in response to an input to the visual object 115 of FIG. 1, the electronic device 101 may display a user interface 310 (UI) for selecting at least one external electronic device among other external electronic devices distinct from the electronic device 101 on the display 240. For example, the user interface 310 may include a visual object 312 for uploading to a sharing platform provided by the sharing platform application 225 of FIG. 2 and/or a visual object 311 for reporting or tipping-off a vehicle present in a video. However, it is not limited thereto. For example, according to an embodiment, the electronic device 101 may display a user interface 310 including a visual object 312 for performing a first editing function and/or a visual object 311 for performing a second editing function.

For example, the electronic device 101 may obtain a video including a vehicle from an imaging device (e.g., the external electronic device 201 of FIG. 2) for the vehicle, mounted in the vehicle. The electronic device 101 may display at least one screen 110 on the display 240, based on execution of the sharing platform application 225 of FIG. 2 that provides a sharing platform for sharing a video. In the screen 110, the electronic device 101 may display a list of a video obtained from the imaging device for the vehicle, by using a thumbnail of the video and/or a name (e.g., a name automatically assigned based on when the video was captured, such as "23-01-02 AM 07:00") of the video. The electronic device 101 may obtain an input for a visual object (e.g., the visual object 115 of FIG. 1) for sharing a video included in the screen 110. In response to the input, the electronic device 101 may display a visual object 312 for transmitting the video to a first external electronic device (e.g., a server providing the sharing platform application 225 of FIG. 2) that provides the sharing platform. After receiving the input for the visual object 312, the electronic device 101 may additionally display a screen for changing the name of the video. For example, the electronic device 101 may display a visual object 311 for transmitting the video to a second external electronic device (e.g., a server related to a report service or tip-off service) that provides another platform distinct from the sharing platform.

For example, in order to generate an editing video corresponding to an external electronic device (e.g., a server) to which the video will be shared, the electronic device 101 may provide an editing function corresponding to the external electronic device. For example, since the purpose of sharing a video is different, a first editing function for transmitting to the first external electronic device (e.g., the server providing the sharing platform) and a second editing function for transmitting to the second external electronic device (e.g., the server related to a report service or tip-off service) may be different. For example, in order to upload on the sharing platform, the electronic device 101 may display, on the display 240, a screen that provides the first editing function to cover a license plate of a vehicle included in the video. For example, in order to report the vehicle included in the video, the electronic device 101 may display, on the display, a screen that provides a second editing function for changing at least one of a size (or capacity) and a length of the video. However, it is not limited thereto.

As described above, according to an embodiment, the electronic device 101 may select an external electronic device to which a video will be shared by using the sharing platform application, independently of playing the video. The electronic device 101 may provide different functions for editing video, according to the purpose of sharing the video, based on the execution of the sharing platform application. The electronic device 101 may tip-off the vehicle included in the video or upload on the sharing platform, by using a chat application linked with the sharing platform application. The electronic device 101 may check other users' evaluation (or advice) for the vehicle in the video, based on the upload on the sharing platform. The electronic device 101 may enhance user convenience by providing different editing functions according to the purpose of sharing the video.

Hereinafter, an example of an operation in which the electronic device 101 provides an editing function for reporting or tipping-off the vehicle included in the video will be described with reference to FIGS. 4A and 4B.

Figure 4A:
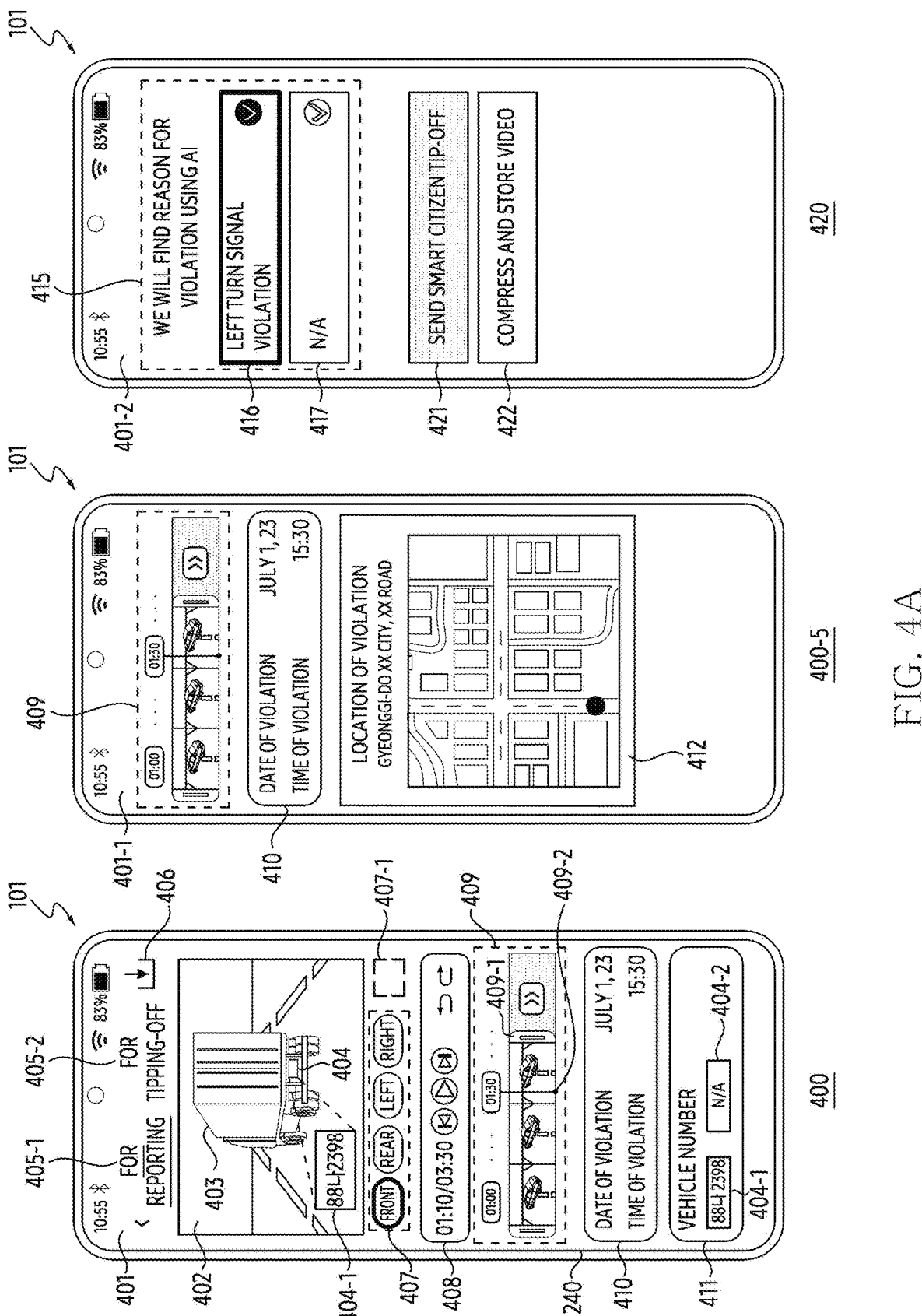
FIGS. 4A and 4B illustrate an example of a user interface that provides an editing function to report a vehicle, according to an embodiment.
Figure 4B:
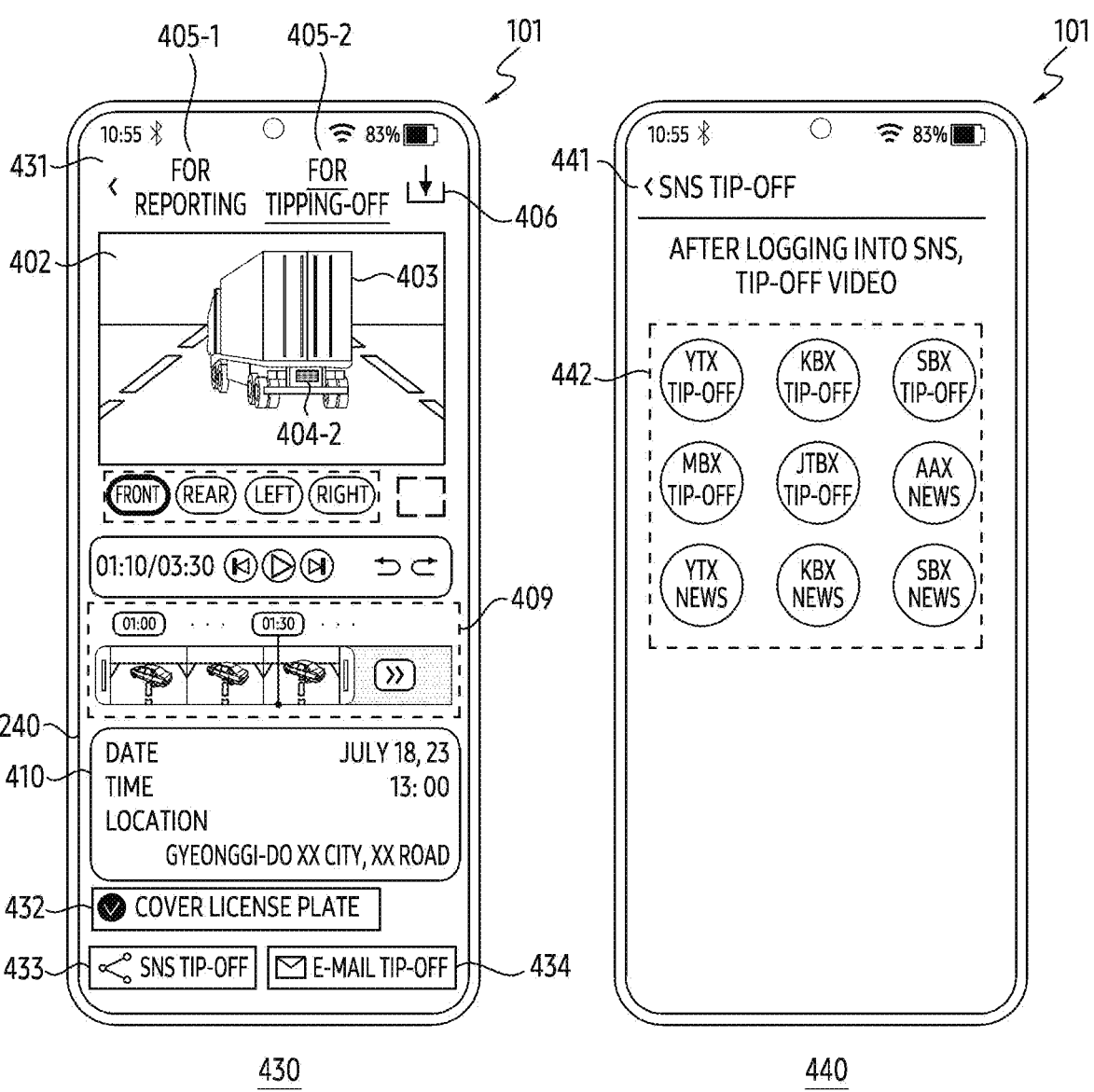

FIGS. 4A and 4B illustrate an example of a user interface that provides an editing function to report a vehicle, according to an embodiment. An electronic device 101 according to an embodiment of FIGS. 4A and 4B may include the electronic device 101 of FIGS. 1 to 3.

Referring to FIG. 4A, in a state 400, the electronic device 101 according to an embodiment may display a screen 401 on a display 240, in response to an input for the visual object 311 of FIG. 3. For example, before displaying the screen 401, the electronic device 101 may display a screen for selecting a video 402 stored in a memory. The video 402 may include a video obtained through a camera of the electronic device 101 or obtained from an external electronic device (e.g., the external electronic device 201 of FIG. 2).

For example, the electronic device 101 may display a screen 401 that provides an editing function (e.g., an editing function for reporting) for reporting among reporting and tipping-off. The screen 401 may include a text object 405-1 to obtain a video for reporting, a text object 405-2 to obtain a video for tipping-off, and/or an icon 406 to download an edited video. For example, the electronic device 101 may obtain a video to be transmitted to an external electronic device (e.g., an external server managing a traffic violation report) related to reporting by using the screen 401. The electronic device 101 may upload the video, which is edited through the screen 401, to a report platform (e.g., a smart citizen tip-off uniform resource locator (URL)) provided by an external electronic device related to reporting. The electronic device 101 may edit at least one of a size (or capacity) and a length (or time) of the video 402 using an editing function corresponding to the external electronic device related to the reporting. The editing function corresponding to the external electronic device related to the reporting may include a function of changing a length of a file (e.g., video) and/or a capacity of the file to be uploaded on the report platform provided by the external electronic device. For example, since the video is uploaded on the report platform in order to report the vehicle, a function of covering a license plate, which specifies the vehicle, may not be provided.

For example, the electronic device 101 may edit the video 402 using a controller 409 for changing at least one of the size and length of the video 402. The electronic device 101 may identify a location (or time) corresponding to at least one of a plurality of frame images included in the video 402, by using an indicator 409-2. The electronic device 101 may change the length of the video 402 using a visual object 409-1.

According to an embodiment, the electronic device 101 may identify a vehicle 403 included in the video 402. The electronic device 101 may identify a license plate 404 corresponding to the vehicle 403 included in the video 402, by using at least one neural network (e.g., the license plate identifier 231 of FIG. 2). The electronic device 101 may extract (or obtain) a text object 404-1 corresponding to the license plate 404, based on the identification of the license plate 404. When one or more vehicles are included in the video 402, since the electronic device 101 may identify a license plate for each of the one or more vehicles using the at least one neural network, a user interface 411 for selecting at least one of the identified license plates may be displayed on the display.

For example, the electronic device 101 may display the user interface 411 for selecting the text object 404-1. For example, the user interface 411 may include the text object 404-1 within the user interface 411 and/or a text object 404-2 (e.g., not applicable (N/A)) to not indicate the license plate. In response to an input to the text object 404-1 or the text object 404-2, the electronic device 101 may select whether to share the video 402 including information on the license plate 404 corresponding to the vehicle 403. However, it is not limited thereto. The electronic device 101 may display another user interface (e.g., an input window) for obtaining text (e.g., 88 or 2398) corresponding to the vehicle 403, independently of the user interface 411. The text may be obtained by using the other user interface, in response to a user input of the electronic device 101.

According to an embodiment, the electronic device 101 may display, on the display, the video 402 obtained through at least one of one or more external electronic devices, by linking with the one or more external electronic devices (e.g., the external electronic device 201 of FIG. 2). The screen 401 may include a visual object 407 for selecting at least one of the one or more external electronic devices linked with the electronic device 101. The electronic device 101 may display, on the display 240, a video 402 corresponding to the selected at least one, by using the visual object 407. However, it is not limited thereto.

For example, the electronic device 101 may display the video 402 according to a size of the display 240, in response to an input to a visual object 407-1 (or visual object 407-1 to initiate a full screen function) included in the screen 401.

For example, the electronic device 101 may display, on the display, a visual object 408 indicating a controller for playing the video 402. The electronic device 101 may play or stop playing the video 402, by using the visual object 408. The electronic device 101 may play another video distinct from the video 402 by using the visual object 408. In the visual object 408, the electronic device 101 may display a full length of the video (e.g., "03:30"), a timing of the video being displayed through the video 402 within the screen 401 (e.g., "01:10"), and one or more visual objects for controlling the play of the video 402. In the visual object 408, the electronic device 101 may display visual objects for changing (e.g., undo and/or redo) the editing history of the video 402 being edited based on the screen 401.

For example, the video 402 may include metadata related to the video 402. The electronic device 101 may display, on the display 240, a visual object 410 indicating the metadata, together with the video 402. The metadata may include time information (e.g., date and time) and location information at which the video was obtained. For example, the electronic device 101 may indicate location information 412 at which the video 402 was obtained as shown in a state 400-4, but is not limited thereto. For example, the electronic device 101 may display the location information 412 in response to an input to the visual object 410. For example, in a state of displaying the screen 401, the electronic device 101 may display the location information 412 on the display 240 by displaying a screen 401-1 corresponding to a state 400-5, in response to a designated input (e.g., a swipe input).

According to an embodiment, after editing the video 402 using the controller 409, the electronic device 101 may transmit the edited video to an external electronic device related to reporting, in response to an input for sharing the edited video. For example, the electronic device 101 may enter a state 420 in response to a designated input (e.g., a swipe input) in the state 400 displaying the screen 401. In the state 420, the electronic device 101 may display a screen 401-2.

For example, the electronic device 101 may use at least one neural network (e.g., the violation type identifier 232 of FIG. 2) to identify a violation type of a vehicle included in the video 402. The at least one neural network may include a neural network trained to determine whether a traffic rule has been violated.

For example, the electronic device 101 may identify a violation type of the vehicle 403 included in the video 402 by inputting the video 402 into the at least one neural network. The electronic device 101 may identify an event related to the vehicle 403 by inputting the video 402 into the at least one neural network. The event may include accident information related to the vehicle.

For example, the electronic device 101 may display a screen 401-2 including a user interface 415 for selecting the identified violation type. The electronic device 101 may display, in the user interface 415, a text object 416 indicating the identified violation type and a text object 417 indicating that the identified violation type is not applicable. Although not illustrated, the electronic device 101 may display a list of a plurality of violation types in the user interface 415. The electronic device 101 may receive an input for selecting at least one violation type in the list of the plurality of violation types.

For example, the electronic device 101 may display a visual object 421 that indicates transmitting the edited video to an external electronic device related to reporting (or a visual object 421 for uploading to a report platform) or a visual object 422 for compressing and storing the edited video. The visual object 421 may include URL information of a report (or tip-off) platform provided by an external electronic device (or server) related to reporting. The electronic device 101 may browse the URL of the report platform in response to an input to the visual object 421. The electronic device 101 may upload the edited video to the report platform based on browsing the URL of the report platform. The electronic device 101 may access the URL and upload the edited video to the report platform. For example, the electronic device 101 may store the edited video in memory, in response to an input to the visual object 422. According to an embodiment, the electronic device 101 may perform editing for changing at least one of a length or a size of the video 402, by using the screen 401 that provides an editing function for reporting. The electronic device 101 may upload another video (or edited video) obtained by performing editing on the video 402 to the report platform.

Referring to FIG. 4B, in a state 430, the electronic device 101 according to an embodiment may display, on the display 240, a screen 431 for providing an editing function for a tip-off. For example, the electronic device 101 may display the screen 431 in response to an input to the text object 405-2 included in the screen 401 of FIG. 4A.

According to an embodiment, the electronic device 101 may perform an editing function for tip-off the vehicle 403 included in the video 402 to the press (e.g., an editing function for tip-off), by using the screen 431. The editing function may be different from another editing function that generate a video for uploading to the report platform of FIG. 4A (e.g., an editing function for reporting). As an example, the editing function may include a function for covering a license plate.

For example, the electronic device 101 may cover a license plate (e.g., the license plate 404-2 of FIG. 4B) corresponding to the vehicle 403, based on the editing function for tip-off to the press. The electronic device 101 may edit the video 402 to overlap the visual object 404-2 with the license plate, in response to an input to an icon 432 for covering the license plate. The electronic device 101 may cover the license plate corresponding to the vehicle 403 by identifying an area corresponding to the license plate through at least one neural network (e.g., the license plate identifier 232), based on rendering the visual object 404-2 in the area. However, it is not limited thereto.

According to an embodiment, the electronic device 101 may receive an input to visual objects 433 and 434 for tipping-off the edited video using the controller 409. The electronic device 101 may enter a state 440, in response to an input to the visual object 433 for using an SNS service provided by the press.

For example, the electronic device 101 may display a screen 441 in the state 440. The screen 441 may include one or more icons 442 indicating one or more presses. In response to an input indicating selection of at least one of the one or more icons 442, the electronic device 101 may upload the edited video to a tip-off (or SNS) platform linked with the press corresponding to the at least one. As an example, the tip-off platform may be related to the report platform of FIG. 4A in terms of being distinct from a sharing platform provided by the sharing platform application 225 of FIG. 2. For example, the electronic device 101 may transmit the edited video together with metadata (e.g., information corresponding to the visual object 410) to an external electronic device (e.g., a server) that provides a tip-off platform. For example, the electronic device 101 may transmit edited video and/or metadata using the controller 409 to an Internet address (e.g., URL) (or e-mail address) linked to the press, in response to an input to the visual object 434. However, it is not limited thereto.

As described above, according to an embodiment, the electronic device 101 may share the video 402 including the vehicle 403, based on execution of the sharing platform application. Before sharing the video 402, the electronic device 101 may determine whether to cover the license plate 404 corresponding to the vehicle 403 in order to protect personal information corresponding to a vehicle included in the video 402. The electronic device 101 may identify the user's purpose in response to an input indicating selection of at least one of the text objects 405-1 and 405-2. The electronic device 101 may determine whether to cover the license plate 404, by identifying the user's purpose for sharing the video 402. The electronic device 101 may display, on the display, a screen 401 or a screen 431 that provide different editing functions, by identifying the user's purpose. The electronic device 101 may enhance user convenience by providing different editing functions according to the user's purpose.

Figure 5:
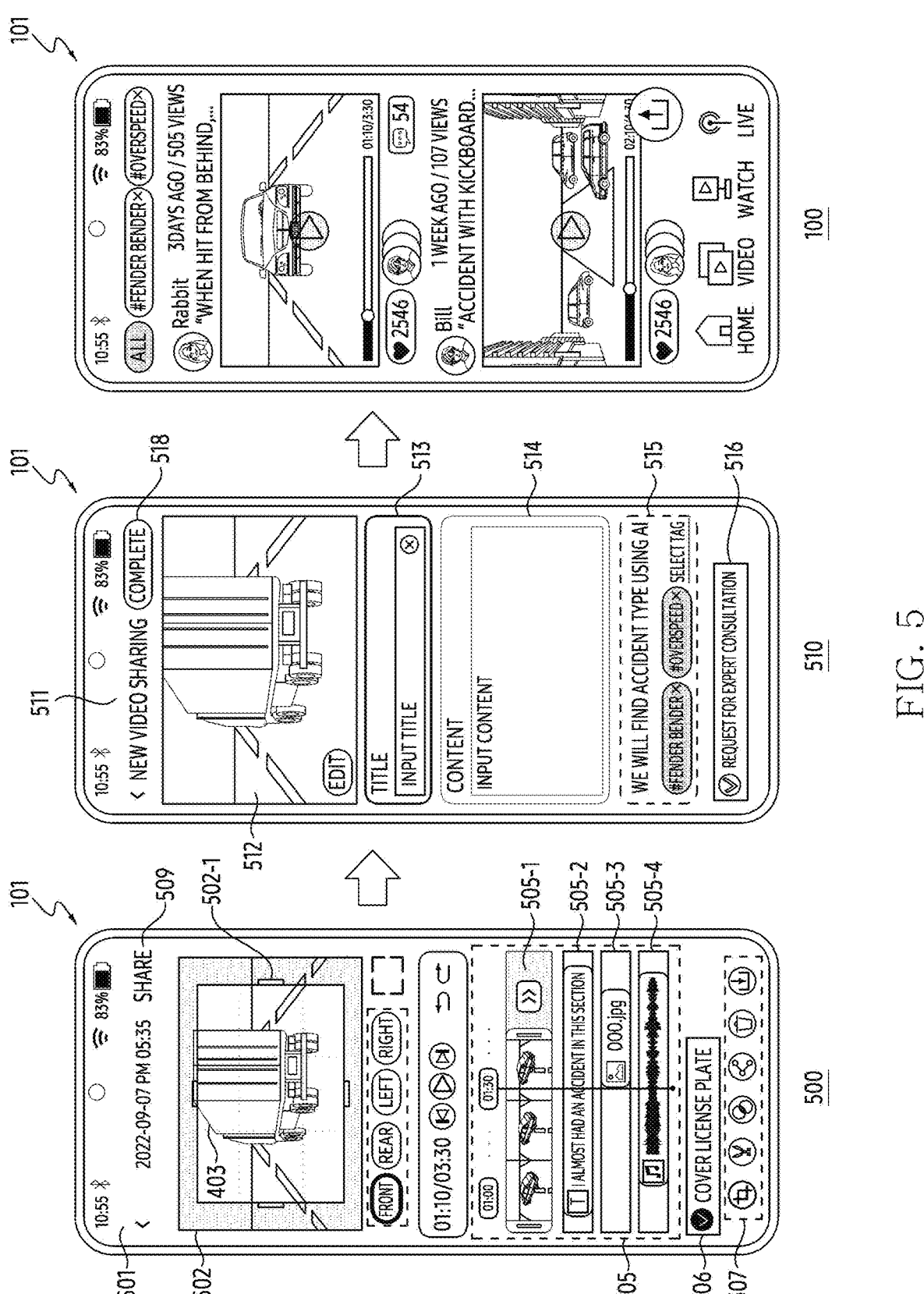
FIG. 5 illustrates an example of a user interface that provides an editing function for uploading a video to a sharing platform, according to an embodiment.

FIG. 5 illustrates an example of a user interface that provides an editing function for uploading a video to a sharing platform, according to an embodiment. An electronic device 101 of FIG. 5 may include the electronic device 101 of FIGS. 1 to 4B.

According to an embodiment, the electronic device 101 may display a screen 501 on the display 240 in a state 500, in response to an input to the visual object 312 of FIG. 3. The screen 501 may include a user interface that provides an editing function for uploading a video on a sharing platform. The editing function may be referred to as an editing function for sharing in terms of editing a video for uploading on a sharing platform.

For example, the electronic device 101 may edit a video 502 based on a controller 505 for synthesizing at least one of text object, image, and audio signal with the video 502 based on the editing function by using the screen 501. For example, the electronic device 101 may change the overall length (or time) of the video 502 by using a first controller 505-1 for changing a length of the video 502.

For example, the electronic device 101 may synthesize a text object on at least a portion of the video 502, by using a second controller 505-2. The electronic device 101 may set a length of the at least portion, by using the second controller 505-2. The electronic device 101 may edit the video 502 such that the text object is played (or displayed) together with the video 502 for a time period corresponding to the at least portion, by using the second controller 505-2.

For example, the electronic device 101 may synthesize an image on at least a portion of the video 502 by using a third controller 505-3. The electronic device 101 may change the video 502 such that the image is displayed on at least a portion of the video 502 for a time period corresponding to the set at least a portion, by using the third controller 505-3. For example, the electronic device 101 may add an audio signal (or voice signal, music) to the video 502 by using a fourth controller 505-4. The electronic device 101 may obtain another video (e.g., an edited video) by changing at least a portion of the video 502 using the controller 505.

According to an embodiment, the electronic device 101 may display a visual object 502-1 in response to an input to at least one of icons 507 corresponding to a function for editing the video 502. The icons 507 may include icons corresponding to a function of changing a screen ratio of the video 502, a function of changing a color of the video 502, a function of transmitting the video 502 to an external electronic device through another software application (e.g., a function of sharing), a function of deleting the video 502, and/or a function of downloading the video 502. However, functions corresponding to the icons 507 are not limited to the above-described embodiment.

For example, the electronic device 101 may change a ratio of the video 502 by using the visual object 502-1. The ratio of the video 502 may mean a ratio between an edge of the video 502 and another edge perpendicular to the edge. However, it is not limited thereto. The electronic device 101 may enlarge or delete at least a portion of the video 502, by using the visual object 502-1.

For example, before uploading the video 502 on a sharing platform, the electronic device 101 may identify an input to an icon 506 for covering a license plate corresponding to a vehicle 403 included in the video 502. The icon 506 may be referred to the icon 432 of FIG. 4B.

According to an embodiment, the electronic device 101 may enter a state 510 from a state 500, in response to an input to a text object 509. In the state 510, the electronic device 101 may display a screen 511 including the video 512 edited in the state 500. The screen 511 may include input windows 513 and 514 for describing the edited video 512. In response to an input (e.g., a touch input) to the input window 513, the electronic device 101 may obtain a user input corresponding to text indicating a title of the video 512. In response to the input to the input window 514, the electronic device 101 may obtain a user input corresponding to text for describing the content of the video 512. However, it is not limited thereto.

For example, the electronic device 101 may identify an event (e.g., a traffic rule violation of a vehicle) that appears through the video 512. The electronic device 101 may represent text objects related to the event. For example, the electronic device 101 may identify a violation type of the vehicle included in the video 512, by inputting the video 512 into at least one neural network. The electronic device 101 may identify an event related to the vehicle by inputting the video 512 into at least one neural network. The event may include accident information related to the vehicle. For example, the electronic device 101 may display a user interface 515 for selecting the identified violation type. The electronic device 101 may display a text object (e.g., a fender bender) indicating the violation type within the user interface 515. When the electronic device 101 identifies one or more events, the electronic device 101 may display a text object for each of the one or more events within the user interface 515. As an example, the electronic device 101 may display the selected text object within the user interface 515, in response to a user input for selecting a text object indicating an event. A text object included in the user interface 515 may be referred to as a hash tag. The hash tag may be related to the visual object 111 of FIG. 1.

According to an embodiment, the screen 511 may include an icon 516 for seeking advice on an event related to the video 512 from at least one user among users using the sharing platform. In response to an input for activating the icon 516, the electronic device 101 may transmit the video 512 and metadata related to the video 512 to at least one user among users using the sharing platform. For example, the at least one user may include a user having specialized knowledge related to the event. For example, when the icon 516 is deactivated, the electronic device 101 may share the video 512 and the metadata related to the video 512 to all users using the sharing platform.

According to an embodiment, the electronic device 101 may upload the video 512 together with a title and content of the video 512 on the sharing platform, in response to an input to a text object 518. The electronic device 101 may enter a state 100 based on uploading the video 512 on the sharing platform, in response to the input to the text object 518. For example, although not illustrated, in the state 100 of FIG. 5, the video 512 and media content (e.g., title and content) related to the video 512 may be displayed by replacing the media content 112 in the screen 110 of FIG. 1. For example, the electronic device 101 may change media content displayed on the top (e.g., a portion adjacent to the visual object 111 of FIG. 1 within the screen 110) of the screen 110 of FIG. 1 over time. However, it is not limited thereto.

According to an embodiment, the electronic device 101 may check comments related to the video 512, based on uploading the video 512 on the sharing platform. The electronic device 101 may obtain advice from other users using the sharing platform as well as a user having specialized knowledge of a vehicle-related event, by using comments related to the video 512. The advice may include information on the percentage of negligence.

As described above, according to an embodiment, the electronic device 101 may edit a video before uploading the video, based on an editing function for sharing for uploading the video to the sharing platform. The electronic device 101 may provide a service capable of editing videos more freely based on an editing function for sharing different from an editing function for reporting or an editing function for tipping-off. The electronic device 101 may provide an editing function for editing video based on a purpose (e.g., for reporting, tipping-off, and/or sharing) of using video, by using one software application (e.g., the sharing platform application 225 of FIG. 2). The electronic device 101 may transmit the edited video based on the editing function to a platform (or external electronic device) corresponding to the purpose (e.g., for reporting, tipping-off, and/or sharing). The electronic device 101 may provide the user with a service capable of utilizing video based on the user's purpose through a sharing platform.

Figure 6:
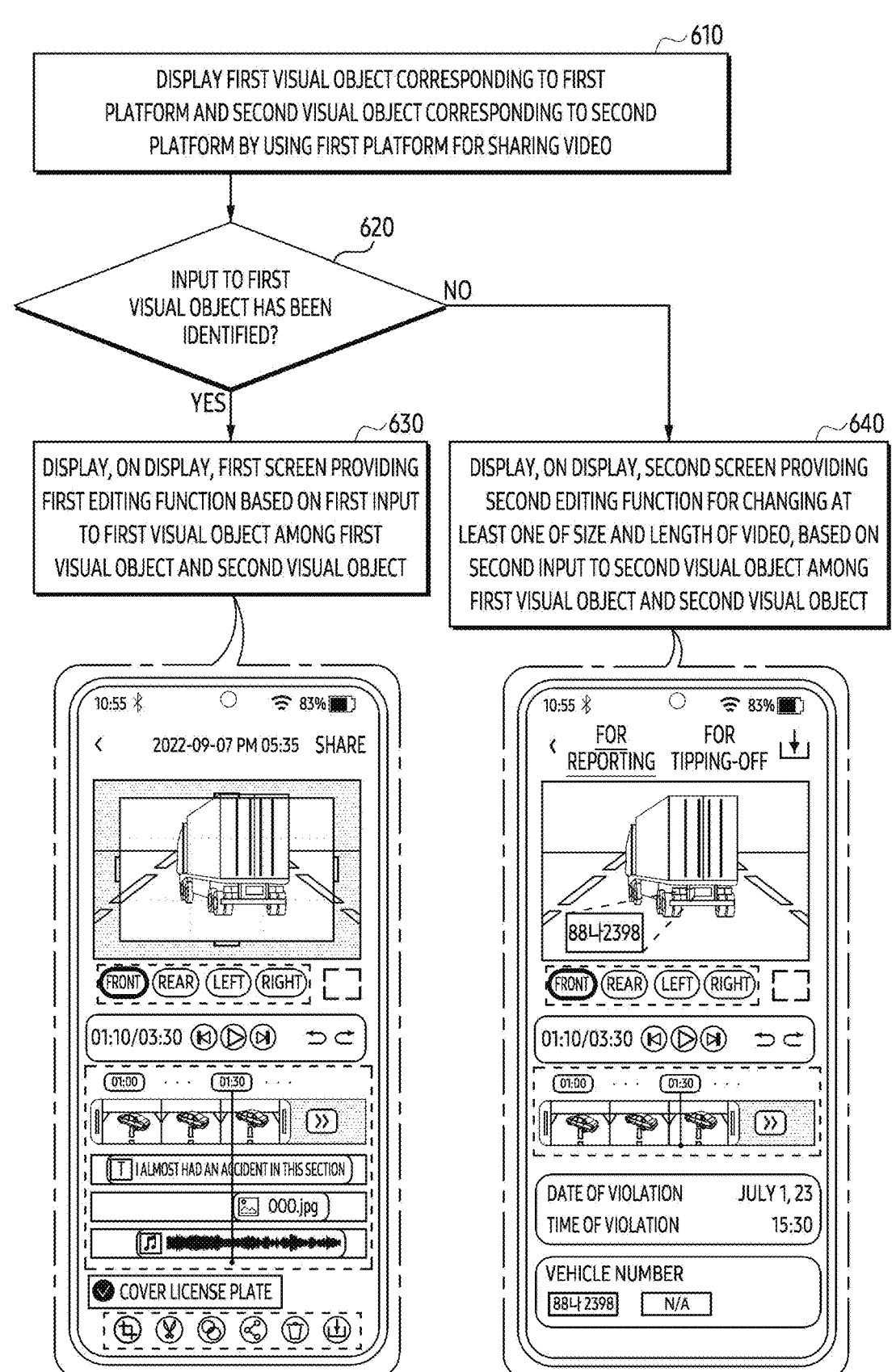
FIG. 6 illustrates an example of a flowchart indicating an operation of an electronic device, according to an embodiment.

FIG. 6 illustrates an example of a flowchart indicating an operation of an electronic device, according to an embodiment. The electronic device of FIG. 6 may include the electronic device 101 of FIGS. 1 to 5. At least one of operations of FIG. 6 may be performed by the electronic device 101 of FIG. 1 and/or the processor 210 of FIG. 2. Each of the operations of FIG. 6 may be performed sequentially, but is not necessarily performed sequentially. For example, the sequence of each operation may be changed, and at least two operations may be performed in parallel.

Referring to FIG. 6, according to an embodiment, in operation 610, the electronic device may display a first visual object corresponding to a first platform and a second visual object corresponding to a second platform by using a first platform for sharing a video. The first platform may include a sharing platform provided by the sharing platform application 225 of FIG. 2. The sharing platform may provide an SNS related to a video corresponding to a vehicle. The first visual object may correspond to the visual object 312 of FIG. 3. The second visual object may correspond to the visual object 311 of FIG. 3. The first visual object corresponding to the first platform may include a visual object for transmitting a video to an external server linked to the first platform. The second visual object corresponding to the second platform may include a visual object for transmitting a video to an external server linked to the second platform. The second platform may be distinct from the first platform. The second platform may include a reporting platform and/or a tipping-off platform, which are distinct from the sharing platform. The reporting platform and/or the tipping-off platform may include a platform for reporting or tipping-off a vehicle corresponding to a video.

Referring to FIG. 6, in operation 620, the electronic device according to an embodiment may check whether an input to the first visual object has been identified.

Referring to FIG. 6, based on a first input to the first visual object among the first visual object and the second visual object (operation 620-YES), in operation 630, the electronic device according to an embodiment may display a first screen providing a first editing function on a display. The first editing function may be referred to as an editing function for sharing. The electronic device may perform editing on a video based on the first editing function. The electronic device may perform editing for adding a text object, an image, and/or an audio signal to at least a portion of the video based on the first editing function. In order to protect an identity of owner corresponding to a vehicle included in a video, the electronic device may cover a license plate corresponding to the vehicle based on the first editing function. A state in which the electronic device displays a first screen (e.g., the screen 501 of FIG. 5) may be referred to as the state 500 of FIG. 5.

For example, the electronic device 101 may share a video with users using the first platform by uploading the edited video based on the first editing function onto the first platform (e.g., a sharing platform).

Referring to FIG. 6, based on a second input to the second visual object among the first visual object and the second visual object (operation 620-NO), in operation 640, the electronic device according to an embodiment may display a second screen providing a second editing function for changing at least one of a size and a length of the video on the display. The second editing function may include an editing function for tipping-off and/or an editing function for reporting. The electronic device may change at least one of the size and length of the video based on the second editing function. Since the content of the video should be specified in order to tip-off or report the vehicle corresponding to the video, the electronic device may edit the video based on the second editing function distinct from the first editing function. However, it is not limited thereto. A state in which the electronic device displays the second screen (e.g., the screen 401 of FIG. 4A) may be referred to as the state 400 of FIG. 4. The electronic device may transmit (or upload) the edited video based on the second editing function to a reporting platform or a tipping-off platform.

As described above, according to an embodiment, an electronic device may comprise communication circuitry, a memory, a display, and at least one processor. The at least one processor may be configured to obtain a video including a vehicle. The at least one processor may be configured to display, using a first platform for sharing the video, a first visual object indicating the first platform, and a second visual object corresponding to a second platform distinct from the first platform. The at least one processor may be configured to display, based on a first input with respect to the first visual object among the first visual object and the second visual object, a first screen providing a first editing function, on the display. The at least one processor may be configured to display, based on a second input with respect to the second visual object among the first visual object and the second visual object, a second screen providing a second editing function for changing at least one of a size or a length of the video, on the display.

For example, the at least one processor may be configured to obtain another video edited from the video, by synthesizing at least one of a text object, an image, an audio signal to the video based on the first editing function using the first screen. The at least one processor may be configured to upload the another video to the first platform.

For example, the at least one processor may be configured to obtain another video distinct from the video based on editing at least one of the size and the length of the video corresponding to the second platform using the second screen. The at least one processor may be configured to upload the another video to the second platform to report the vehicle included in the another video.

For example, the at least one processor may be configured to upload the another video obtained using the second screen to the second platform providing a social network service (SNS). The another video may include time information and location information that the video was generated.

For example, the at least one processor may be configured to identify a license plate corresponding to the vehicle based on obtaining the video. The at least one processor may be configured to display the second screen including a user interface for selecting a text object corresponding to the license plate.

For example, the at least one processor may be configured to display, based on identifying the license plate, the first screen or the second screen including an icon for covering the license plate, on the display.

For example, the at least one processor may be configured to identify a violation type of the vehicle by inputting the video to a neural network trained to determine whether a traffic rule is violated.

For example, the at least one processor may be configured to obtain the video including the vehicle through the communication circuitry from a third external electronic device attachable to another vehicle different from the vehicle.

For example, the electronic device may further comprise a camera. For example, the at least one processor may be configured to obtain the video including the vehicle through the camera.

As described above, according to an embodiment, a method of an electronic device with communication circuitry, a memory, a display, and at least one processor may comprise obtaining a video including a vehicle. The method may comprise displaying, using a first platform for sharing the video, a first visual object indicating the first platform, and a second visual object corresponding to a second platform distinct from the first platform. The method may comprise displaying, based on a first input with respect to the first visual object among the first visual object and the second visual object, a first screen providing a first editing function, on the display. The method may comprise displaying, based on a second input with respect to the second visual object among the first visual object and the second visual object, a second screen providing a second editing function for changing at least one of a size or a length of the video, on the display.

For example, the method may comprise obtaining another video edited from the video, by synthesizing at least one of a text object, an image, an audio signal to the video based on the first editing function using the first screen. The method may comprise uploading the another video to the first platform.

For example, the method may comprise obtaining another video distinct from the video based on editing at least one of the size and the length of the video corresponding to the second platform using the second screen. The method may comprise uploading the another video to the second platform to report the vehicle included in the another video.

For example, the method may comprise uploading the another video obtained using the second screen to the second platform providing a social network service (SNS). The another video may include time information and location information that the video was generated.

For example, the method may comprise identifying a license plate corresponding to the vehicle based on obtaining the video. The method may comprise displaying the second screen including a user interface for selecting a text object corresponding to the license plate.

For example, the displaying the second screen may comprise displaying, based on identifying the license plate, the first screen or the second screen including an icon for covering the license plate, on the display.

As described above, according to an embodiment, a non-transitory computer readable storage medium storing one or more programs, the one or more programs may comprise instructions, when executed by an electronic device, cause the electronic device to obtain a video including a vehicle. The one or more programs may comprise instructions, when executed by the electronic device, cause the electronic device to display, using a first platform for sharing the video, a first visual object indicating the first platform, and a second visual object corresponding to a second platform distinct from the first platform. The one or more programs may comprise instructions, when executed by the electronic device, cause the electronic device to display, based on a first input with respect to the first visual object among the first visual object and the second visual object, a first screen providing a first editing function, on a display. The one or more programs may comprise instructions, when executed by the electronic device, cause the electronic device to display, based on a second input with respect to the second visual object among the first visual object and the second visual object, a second screen providing a second editing function for changing at least one of a size or a length of the video, on the display.

For example, the one or more programs may comprise instructions, when executed by the electronic device, cause the electronic device to obtain another video edited from the video, by synthesizing at least one of a text object, an image, an audio signal to the video based on the first editing function using the first screen. The one or more programs may comprise instructions, when executed by the electronic device, cause the electronic device to upload the another video to the first platform.

For example, the one or more programs may comprise instructions, when executed by the electronic device, cause the electronic device to obtain another video distinct from the video based on editing at least one of the size and the length of the video corresponding to the second platform using the second screen. The one or more programs may comprise instructions, when executed by the electronic device, cause the electronic device to upload the another video to the second platform to report the vehicle included in the another video.

For example, the one or more programs may comprise instructions, when executed by the electronic device, cause the electronic device to upload the another video obtained using the second screen to the second platform providing a social network service (SNS). The another video may include time information and location information that the video was generated.

For example, the one or more programs may comprise instructions, when executed by the electronic device, cause the electronic device to identify a license plate corresponding to the vehicle based on obtaining the video. The one or more programs may comprise instructions, when executed by the electronic device, cause the electronic device to display the second screen including a user interface for selecting a text object corresponding to the license plate.

The device described above may be implemented as a hardware component, a software component, and/or a combination of a hardware component and a software component. For example, the devices and components described in the embodiments may be implemented by using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but a person who has ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to the embodiment may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include a magnetic medium such as a hard disk, floppy disk, and magnetic tape, optical recording medium such as a CD-ROM and DVD, magneto-optical medium, such as a floptical disk, and those configured to store program instructions, including ROM, RAM, flash memory, and the like. In addition, examples of other media may include recording media or storage media managed by app stores that distribute applications, sites that supply or distribute various software, servers, and the like.

As described above, although the embodiments have been described with limited examples and drawings, a person who has ordinary knowledge in the relevant technical field is capable of various modifications and transform from the above description. For example, even if the described technologies are performed in a different order from the described method, and/or the components of the described system, structure, device, circuit, and the like are coupled or combined in a different form from the described method, or replaced or substituted by other components or equivalents, appropriate a result may be achieved.

Therefore, other implementations, other embodiments, and those equivalent to the scope of the claims are in the scope of the claims described later.

What is claimed is:

1. An electronic device comprising:
communication circuitry;
a memory;
a display; and
at least one processor, wherein the at least one processor is configured to:
obtain a first video indicating a vehicle;
identify, from the first video, information of a license plate represented in the first video;
display a first visual object corresponding to a social network service (SNS) and a second visual object corresponding to a network service for reporting an event associated with the vehicle using the first video;

based on a first input with respect to the first visual object among the first visual object and the second visual object, display a first screen for determining a second video to be uploaded to the SNS, wherein the second video is an edited version of the first video such that the license plate is not visible in a portion of a preview video; and based on a second input with respect to the second visual object among the first visual object and the second visual object, display a second screen for determining at least a portion of the first video to be uploaded, together with the information of the license plate, to the network service.

2. The electronic device of claim 1, wherein the at least one processor is configured to:

obtain the second video edited from the first video, by synthesizing at least one of a text object, an image, an audio signal to the first video based on an editing function using the first screen; and upload the second video to the SNS.

3. The electronic device of claim 1, wherein the at least one processor is configured to:

obtain a third video distinct from the first video based on editing at least one of a size and a length of the first video corresponding to a social network using the second screen, and upload the third video to the social network to report the vehicle indicated in the third video.

4. The electronic device of claim 3, wherein the third video includes time information and location information that the third video was generated.

5. The electronic device of claim 3, wherein the at least one processor is configured to:

display the second screen including the third video to be uploaded to the network service, wherein the third video is an edited version of the first video such that the license plate is included.

6. The electronic device of claim 1, wherein the at least one processor is configured to:

display, based on identifying the license plate, the first screen or the second screen including an icon for covering the license plate, on the display.

7. The electronic device of claim 1, wherein the at least one processor is configured to:

identify a violation type of the vehicle by inputting the first video to a neural network trained to determine whether a traffic rule is violated.

8. The electronic device of claim 1, wherein the at least one processor is configured to:

obtain the first video including the vehicle through the communication circuitry from a third external electronic device attachable to another vehicle different from the vehicle.

9. The electronic device of claim 1, further comprises a camera, wherein the at least one processor is configured to:

obtain the first video including the vehicle through the camera.

10. A method of an electronic device with communication circuitry, a memory, a display, and at least one processor, comprising:

obtaining a first video indicating a vehicle;

identifying, from the first video, information of a license plate represented in the first video;

displaying a first visual object corresponding to a social network service (SNS) and a second visual object corresponding to a network service for reporting an event associated with the vehicle using the first video;

based on a first input with respect to the first visual object among the first visual object and the second visual object, displaying a first screen for determining a second video to be uploaded to the SNS, wherein the second video is an edited version of the first video such that the license plate is not visible in a portion of a preview video; and based on a second input with respect to the second visual object among the first visual object and the second visual object, displaying a second screen for determining at least a portion of the first video to be uploaded, together with the information of the license plate, to the network service.

11. The method of claim 10, comprising:

obtaining the second video edited from the first video, by synthesizing at least one of a text object, an image, an audio signal to the first video based on an editing function using the first screen; and uploading the second video to the SNS.

12. The method of claim 10, comprising:

obtaining a third video distinct from the first video based on editing at least one of a size and a length of the first video corresponding to a social network using the second screen, and uploading the third video to the social network to report the vehicle indicated in the third video.

13. The method of claim 12, wherein the third video includes time information and location information that the third video was generated.

14. The method of claim 12, comprising:

displaying the second screen including the third video to be uploaded to the network service, wherein the third video is an edited version of the first video such that the license plate is included.

15. The method of claim 10, wherein the displaying the second screen comprising:

displaying, based on identifying the license plate, the first screen or the second screen including an icon for covering the license plate, on the display.

16. A non-transitory computer readable storage medium storing one or more programs, wherein the one or more programs comprising instructions, when executed by an electronic device, cause the electronic device to:

obtain a first video indicating a vehicle;

identify, from the first video, information of a license plate represented in the first video;

display a first visual object corresponding to a social network service (SNS) and a second visual object corresponding to a network service for reporting an event associated with the vehicle using the first video;

based on a first input with respect to the first visual object among the first visual object and the second visual object, display a first screen for determining a second video to be uploaded to the SNS, wherein the second video is an edited version of the first video such that the license plate is not visible in a portion of a preview video; and based on a second input with respect to the second visual object among the first visual object and the second visual object, display a second screen for determining at least a portion of the first video to be uploaded, together with the information of the license plate, to the network service.

17. The non-transitory computer readable storage medium of claim 16, wherein the one or more programs comprising instructions, when executed by the electronic device, cause the electronic device to:

obtain the second video edited from the first video, by synthesizing at least one of a text object, an image, an audio signal to the first video based on an editing function using the first screen; and upload the second video to the SNS.

18. The non-transitory computer readable storage medium of claim 16, wherein the one or more programs comprising instructions, when executed by the electronic device, cause the electronic device to:

obtain a third video distinct from the first video based on editing at least one of a size and a length of the first video corresponding to a social network using the second screen, and upload the third video to the social network to report the vehicle indicated in the third video.

19. The non-transitory computer readable storage medium of claim 18, wherein the third video includes time information and location information that the third video was generated.

20. The non-transitory computer readable storage medium of claim 18, wherein the one or more programs comprising instructions, when executed by an electronic device, cause the electronic device to:

display the second screen including the third video to be uploaded to the network service, wherein the third video is an edited version of the first video such that the license plate is included.

\* \* \* \* \*